United States Patent
Chan et al.

[11] 3,772,464
[45] Nov. 13, 1973

[54] ROTATING POLYGON MIRROR ASSEMBLY WITH AN INTERIOR MOTOR

[75] Inventors: Kingsley Chan, Saratoga, Calif.; Willard E. Buck, Mesa, Ariz.

[73] Assignee: Spectrotherm Corporation, Santa Clara, Calif.

[22] Filed: Apr. 17, 1972

[21] Appl. No.: 244,473

[52] U.S. Cl. .................. 178/7.6, 350/7, 350/285, 350/288
[51] Int. Cl. ............................................. H04n 3/08
[58] Field of Search .................. 178/7.6, DIG. 27; 350/6, 7, 285, 289, 288; 250/235

[56] References Cited
UNITED STATES PATENTS

| | | | |
|---|---|---|---|
| 1,850,629 | 3/1932 | Karolus | 178/7.6 |
| 3,372,230 | 3/1968 | Wurz | 178/7.6 |
| 2,099,872 | 11/1937 | Stern | 178/7.6 |
| 3,552,836 | 1/1971 | Oskam | 350/289 |
| 2,639,421 | 5/1953 | Miller | 178/7.6 |
| 3,497,377 | 2/1970 | Allingham | 350/288 |
| 3,008,375 | 11/1961 | Henderson | 350/289 |

*Primary Examiner*—Robert L. Griffin
*Assistant Examiner*—Joseph A. Orsino, Jr.
*Attorney*—Karl A. Limbach et al.

[57] ABSTRACT

A compact optical scanner having a plurality of flat mirror elements formed on the outside surface of a polygon shaped cup-like element which is driven by an electrical motor interior of the cup. In addition to shielding provided by the mirror element itself, a ferromagnetic motor housing is provided for suppressing undesired electromagnetic radiation from the motor. The polygon mirror assembly is non-ferromagnetic, of light weight, and supported in a manner to be dynamically balanced.

14 Claims, 4 Drawing Figures

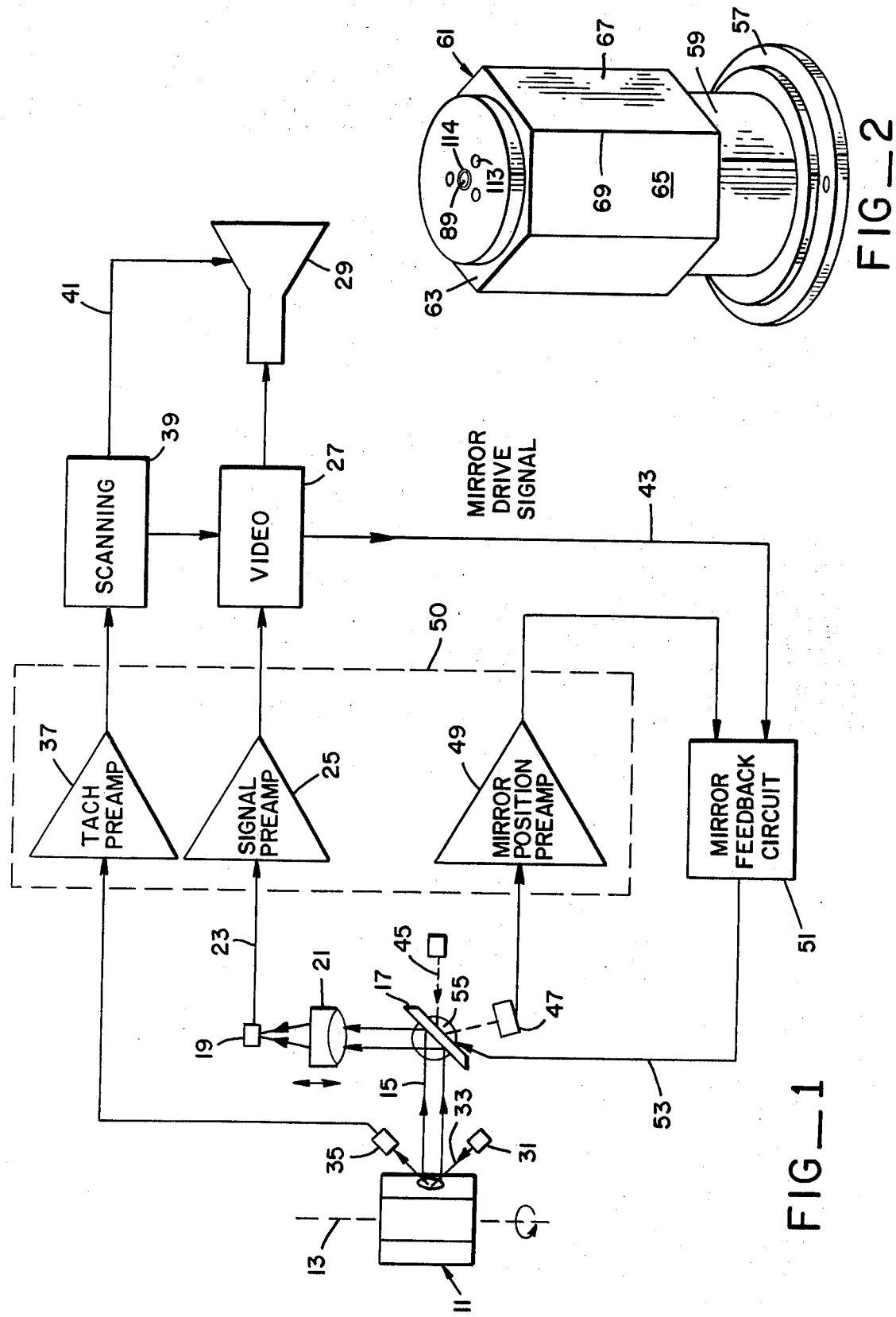

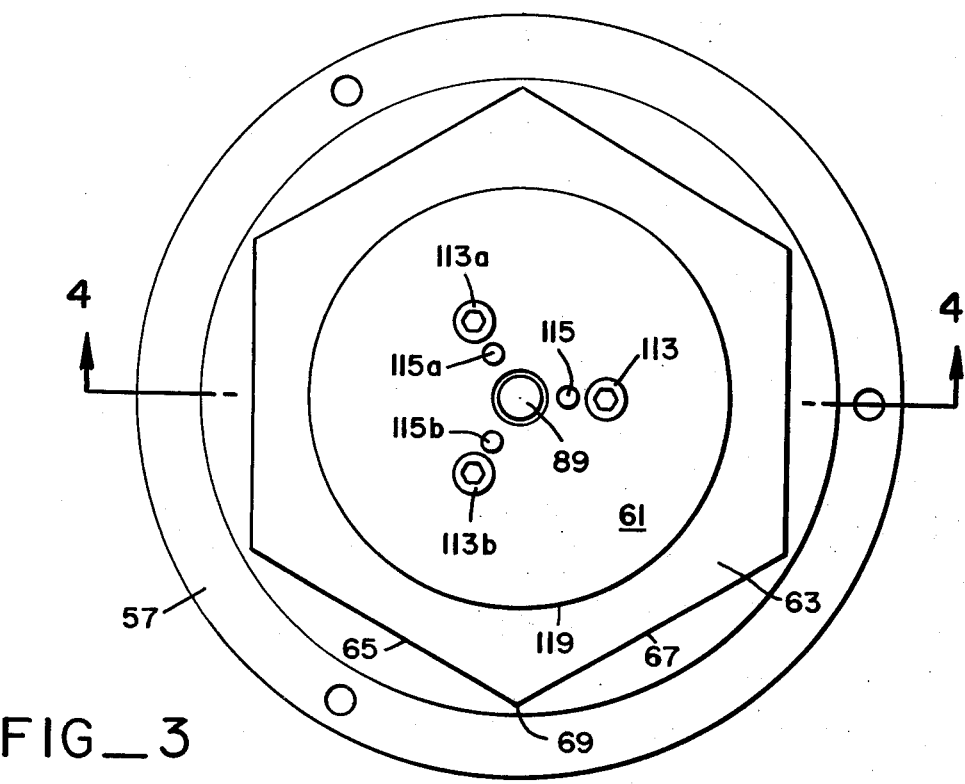
FIG_3
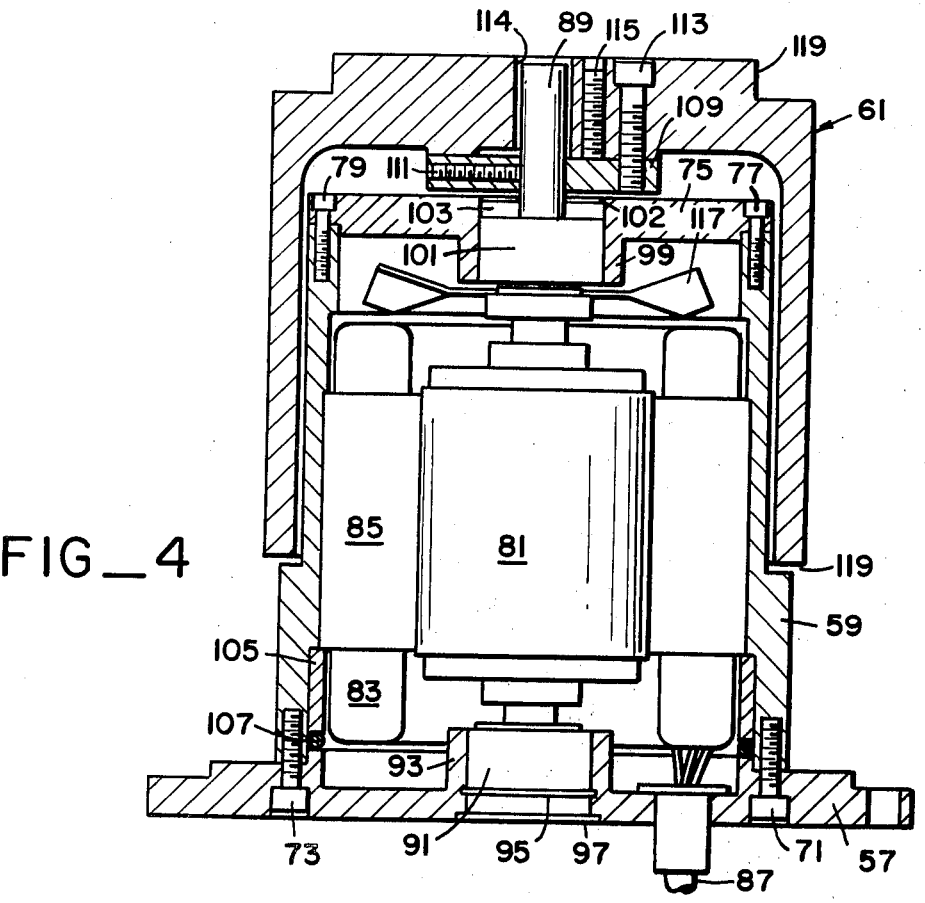
FIG_4

ROTATING POLYGON MIRROR ASSEMBLY WITH AN INTERIOR MOTOR

BACKGROUND OF THE INVENTION

The present invention relates generally to optical scanners and more specifically to improvements in a rotating mirror assembly.

A typical imaging system in a number of specific environments and applications includes a single element substantially point radiation detector. An image of an object field is scanned in two dimensions relative to the detector in order to generate from the detector an electronic signal that is representative of information of the object field. The electronic signal is then used for generating an optical image of the object field by the use of a cathode ray tube or some similar display device. This general technique has particular application wherein the object field radiation of interest is electromagnetic radiation outside the visible spectrum. The technique results in translation of electromagnetic radiation from the near visible or invisible portions of the spectrum into the visible portion of the spectrum. An example of a device of this type is an infrared thermograph wherein the detector is sensitive to infrared radiation and the optical image reconstructed is a thermal map of the object field. A thermograph has a specific application in medical diagnostic work for observing the temperature characteristics of a patient.

In this class of devices, the image of the object field is usually scanned across the detector by two independent optical scanning assemblies, one assembly for moving the image in a horizontal direction and one for moving it in a vertical direction across the detector. The scanning pattern is most commonly a two-dimensional raster scan. A rotating polygon mirror assembly is often used for scanning the object field image in a horizontal direction across the detector. Such a mirror assembly is composed of a plurality of equal flat mirror elements joined together to form a continuous circumferential surface having a cross-sectional shape of a polygon. The assembly is rotated about an axis of rotation with which each of the mirror elements is held parallel. Each mirror element scans an image of the object field once across the radiation detector in a horizontal direction.

It is an object of the present invention to provide a rotating polygon mirror assembly that is compact.

It is another object of the present invention to provide a rotating polygon mirror assembly that does not generate electromagnetic radiation outside of the assembly that can interfere with closely positioned electronic components.

It is yet another object of the present invention to provide a rotating polygon mirror assembly that is extremely stable during operation.

It is a further object of the present invention to provide a rotating polygon mirror assembly that is rugged.

It is another object of the present invention to provide a rotating polygon mirror assembly that is so accurately dynamically balanced that it is virtually free of vibration.

It is still another object of the present invention to provide a rotating mirror assembly that is easily mounted into and removed from a larger electronic instrument.

SUMMARY OF THE INVENTION

Briefly, these and additional objects are accomplished by a rotating mirror structure wherein the individual mirrors are formed on the outside of a cup-like element which is oriented to telescope over at least a portion of its driving motor. This arrangement provides for compactness of the overall mirror assembly and additionally allows the mirror to contribute to shielding the space external of the mirror assembly from undesired electromagnetic fields generated from operation of the motor. To additionally suppress radiation generated by the motor, a stationary housing also surrounds the motor. At least a portion of this housing is preferably constructed of a ferromagnetic material for efficient suppression of unwanted magnetic fields generated by the motor.

A non-ferromagnetic material is preferably employed for the rotating polygon mirror element in order to prevent its magnetization. If polarized magnetically, the rotating polygon would sweep its magnetic field across associated electronic components and thereby generate undesirable noise in the electronic circuits. Aluminum is a preferred material for the rotating polygon mirror assembly which also has the advantage of being lightweight and of low mass inertia. The surfaces of the aluminum polygon mirror element are machined to the necessary optical and mechanical tolerances. The surfaces can be further coated with reflecting materials as may be required prior to final optical polishing, or, alternatively, the aluminum itself can form the reflecting surface. The element is additionally rotated in a manner that each mirror element remains parallel to the axis of rotation at all times within very close tolerances.

Additional structural features and advantages of the improved rotating mirror assembly of the present invention are provided in the following detailed description of a preferred embodiment thereof which is to be taken in conjunction with the accompanying drawings.

BRIEF DESCRIPTION OF THE DRAWINGS

FIG. 1 shows a typical optical scanning environment in which the improved rotating mirror assembly of the present invention is utilized;

FIG. 2 is a perspective view of the improved rotating mirror assembly of the present invention;

FIG. 3 is a top view of the mirror assembly of FIG. 2; and

FIG. 4 is a vertical section of the improved rotating mirror of the present invention taken across section 4—4 of FIG. 3.

DESCRIPTION OF THE PREFERRED EMBODIMENTS

Referring to FIG. 1, on application of the rotating polygon mirror assembly of the present invention is illustrated. A polygon mirror assembly 11 is shown throughout this description to have six sides, but it will be understood that some other number of equal width sides may be used, depending on its application. The mirror assembly 11 is rotated about an axis 13 with which each of the mirrors is made to be accurately parallel. A motor which drives the polygon mirror 11 at a uniform angular velocity is housed within the mirror assembly itself. Light from an object field being imaged (traveling into the paper of FIG. 1) is reflected off of each of the mirror faces one at a time as they are rotated. An object modified light beam 15 is reflected thereby onto an angularly rotatable mirror 17. The object modified light beam 15 is reflected by the mirror 17 onto an appropriate photo-detector 19. A lens assembly 21 is disposed in the object modified light beam and is made adjustable to focus an image of the desired object field onto the photo detector 19.

The photo-detector 19 is a substantial point and the two-dimensional object image is scanned by the rotating mirror assembly 11 and the rocking mirror 17 over the point detector 19 in a two-dimensional raster pattern. The polygon mirror assembly 11 scans a horizontal aspect of the object field across the detector 19 perhaps several hundred times while the rocking mirror 17 scans the vertical aspect of the object image across the detector 19 one time. Each face of the mirror assembly 11 causes the image to be scanned once across the detector 19 in a horizontal direction. A time varying electrical signal is generated at the output of the photo-detector 19 and in the line 23 which contains information of the object image. The signal in the line 23 is initially amplified by a preamplifier 25 and then is applied to a video processing circuit 27. The output of the video processing circuit 27 drives a cathode ray tube 29 which then converts the time varying electrical signals back into a two-dimensional image of the object being scanned.

In order for the image presented on the cathode ray tube 29 not to be distorted, the electron beam thereof must be scanned in the same pattern as the image is scanned across the detector 19. This synchronism is accomplished in the horizontal direction by a light source 31, such as a light emitting diode, which directs a beam of light 33 against the rotating polygon mirror assembly 11. The reflected light therefrom is detected by a photo-detector 35. A signal generated by the photo-detector 35 is amplified by a preamplifier 37. The output of the preamplifier 37 is thus a series of pulses, one pulse each time the rotating polygon mirror 11 has one of its mirror surfaces in a predetermined reference position wherein the reflected portion of the light beam 33 falls on the narrow photo-detector 35. This output of the preamplifier 37 controls a scanning circuit 39 which includes synchronous logic and horizontal and vertical scanning oscillators. The outputs of these oscillators are fed through a line 41 to the deflection coils of the cathode ray tube 29 for controlling the path of the electron beam.

The image is scanned in a vertical direction across the detector 19 in accordance with a mirror drive signal in a line 43 which is in synchronism with the vertical oscillator output of the scanning circuit 39 that is delivered through the line 41 to the cathode ray tube 29. In order to avoid distortion of the image displayed on the cathode ray tube 29, it is important, therefore, that the mirror 17 be scanned in a very accurate manner in accordance with the output of the vertical oscillator. This is accomplished by the use of a feedback network wherein the angular position of the mirror 17 is detected by reflecting a light beam 45 from its backside and onto a linear photo-detector 47. The output of the photo-detector 47 is amplified by a preamplifier 49 and the output of the preamplifier 49 is fed through a feedback circuit 51 and a line 53 to a torque motor 55 which controls the angular position of the mirror 17. The position signal at the output of the preamplifier 49 is compared in the feedback circuit 51 with the desired motion signal in the line 43 that is developed from the vertical scanning oscillator.

The type of system shown in FIG. 1 has a primary use where electromagnetic light energy being detected by the detector 19 is in the invisible and near visible regions. The system thus serves to translate electromagnetic energy from without the visible spectrum into a visible display on the face of the cathode ray tube 29. An example of such electromagnetic energy is infrared radiation. One use of such a system is for medical diagnostic work wherein an image of a human patient displays the patient's temperature. The detector 19 for an infrared thermograph is preferably a mercury-cadmium-telluride detector which changes resistance in response to infrared radiation intensity. Additional details of a complete thermograph system may be had by reference to a co-pending application filed Mar. 6, 1972 by R. P. Hunt and R. H. Winkler, entitled, "Infrared Imaging System", Ser. No. 232,015.

In a thermograph, as well as in other image scanning apparatus, it is often desirable that all components be included in a single small package. For instance, the apparatus illustrated in FIG. 1 is preferably included in one case where the object field radiation is received at one end thereof for reflection by the polygon mirror assembly 11 and the cathode ray tube 29 is positioned at an opposite end of the case for review by an operator. Such a single package design, made as compact as possible, presents certain interference problems among components. For this reason, the preamplifiers 25, 37 and 49 of FIG. 1 are desirably shielded by enclosure within a metal subcompartment 50 from the rest of the circuitry. The structure of the polygon mirror 11 also must be such that undesirable radiation or moving magnetic fields are not emitted therefrom which will be induced into adjacent electronic circuits, detectors or the display tube itself, and cause undesirable interference and noise levels. Since the polygon mirror assembly 11 is most conveniently driven by a 60 Hz. alternating current electric motor, the radiation from this motor must be suppressed and this is preferably done by the mirror assembly itself. The 60 cycle radiation from the polygon mirror driving motor is especially a problem in one particular instrument of the type illustrated in FIG. 1 wherein the scanning speed of the image across the detector 19 is rather slow, in the order of 2 seconds for a single complete two-dimensional image scan (frame). At this slow frame rate, interference resulting from 60 Hz. radiation generated by the motor is particularly noticeable in the image formed on the cathode ray tube 29. The interference problem is the same with a 50 Hz. driven motor. Even a d.c. motor presents interference problems because of moving magnetic fields generated thereby.

Referring to FIG. 2, the general construction of the rotating mirror assembly 11 may be observed. A mounting flange 57 is provided at the bottom of the assembly. A cylindrically shaped ferromagnetic housing 59 is supported by the mounting flange 57 and surrounds the driving electric motor. A rotating polygon mirror element 61 is in the shape generally of an inverted cup with its interior space hollow in order to be positioned to depend downward over at least a portion of the housing 59. The polygon mirror element 61 is rotated with respect to the housing 59 by the motor contained therein.

The rotating polygon mirror element 61 contains a plurality of individual planar mirror elements of equal rectilinear shape, shown herein to be six elements, which are held along one side by a top plate 63 and additionally are joined together along another side. For instance, the mirror surfaces 65 and 67 are joined together at a line 69. In the embodiment described herein, the mirror elements, such as 65 and 67, are made to be flat. The entire polygon mirror element 61 is preferably all of one piece of material. The polygon mirror element 61 is shaped and held in a manner that each of its mirror surfaces, such as 65 and 67, are held accurately parallel to an axis of rotation at all times.

The number of individual mirror elements will vary depending on the particular scanning application but a minimum of four sides (a square shape) is mechanically practical with the configuration of FIG. 2. Additionally, the various aspects of the present invention may be employed wherein the individual mirror elements, such as 65 and 67, have different widths and angles of intersection, but it is described herein to include a plurality (specifically six) flat mirror elements wherein each mirror element has the same width and all angles of intersection therebetween are equal, thereby forming a regular polygon in cross-section. The regular polygon shape of the mirror element 61 is shown most clearly from FIG. 3 which is a top view thereof. The usual application of the mirror assembly as an optical scanner requires that it be a high precision assembly. For instance, typical specifications require that the angular deviation between mirror faces around the outside surface of the polygon element 61 be within plus or minus two arcminutes and permissible angular deviation of each face from the axis of rotation within plus or minus 13 arcseconds. The rotating mirror assembly structure described herein in detail is capable of meeting such precision requirements.

Referring in particular to FIG. 4, the structure of the rotating polygon mirror of the present invention is described in detail. The housing 59, preferably made of a ferromagnetic material, is a cylindrical shell and is held at one end thereof by screws 71 and 73 to the mounting flange 57. A cap 75 is attached to the other (upper) end of the housing 57 by screws 77 and 79.

Within the enclosed chamber formed by the housing 58, the mounting flange 57 and the cap 75 is an electric motor having a rotor 81, a stator core 83 and a stator coil (field winding) 85. This is a typical 60 Hz. synchronous motor configuration. The motor is supplied electrical energy by electrical wires 87 which extend to the motor through an opening in the mounting flange 57. The rotor 81 of the electric motor drives a shaft 89 at a uniform angular velocity.

The shaft 89 is supported at its bottom end by a ball bearing assembly 91 which permits its rotation with respect to the mounting flange 57. The ball bearing assembly 91 is held by a lower bearing housing 93 which is a unitary part of the mounting flange 57. The bearing assembly 93, and thus the rotating shaft 89, is held against gravity by a retaining ring 95 that is held in an annular groove of the lower bearing housing 93. A cap seals off the opening created by the lower bearing housing 93 from the outside.

An upper bearing housing 99 is provided as an integral part of the cap 75. Within the bearing housing 99 is contained a second bearing assembly 101 which holds the shaft 89 above the motor. A spring washer 103 is provided within the upper bearing housing 99 above the ball bearing assembly 101. A retaining ring 102 is held by the upper bearing housing 99. The spring washer 103 pushes against the retaining ring 102 and downward on the bearing assembly 101 to remove any axial play of the shaft 89. The stator assembly of the motor is held against gravity by a stator retainer ring 105 and an O-ring 107 held within the housing 59 against its inner surface. The center of gravity of the mirror element 61 preferably lies between the support bearings 91 and 101 and on the axis of rotation.

The rotating polygon mirror element 61 is not attached directly to the top of the rotating shaft 89 but rather is connected therewith through a mirror mounting flange 109, thus permitting precise adjustment of the rotating mirror element 61 with respect to the shaft 89. The mirror mounting flange 109 is rigidly attached to the rotating shaft 89 for rotating therewith. A screw 111 is threadedly attached to the mirror mounting flange 109 and its end engages the shaft 89. The polygon mirror element 61 is in turn attached to the mirror mounting flange 109 by a plurality of screws 113, 113a and 113b. A plurality of set screws 115, 115a and 115b are also threadedly attached to the top of the polygon mirror element 61 at 120° arc intervals about the shaft 89 in a manner that they can be adjusted from its top to position the mirror mounting flange vertically with respect to the polygon mirror element 61. The set screws 115 are first adjusted and then the screws 113 are caused to threadedly engage the mirror mounting flange 109 to draw it against the lower ends of the set screws 115 and thus rigidly hold it to the polygon mirror element 61. It can be seen that individual set screws 115, 115a and 115b may be adjusted in a manner relative to one another to adjust the angle by which the mirror element 61 is attached to the shaft 89. An opening 114 in the center of the top portion of the mirror element 61 is made sufficiently larger than the outside diameter of the shaft 89 to permit some play. It is this adjustment that is critical in keeping the individual mirror faces parallel to the axis of rotation of the shaft 89 within close tolerances and as a fine adjustment to provide precise dynamic balance.

Since the electric motor is a source of heat, a cooling fan 117 may be necessary. If it is utilized, the fan 117 may be rigidly attached to the shaft 89 at a position along its length between the top of the motor and the bottom of the bearing assembly 101. Additionally, a space 119 is provided between the inside of the mirror element 61 and its associated outside cylindrical housing surface. This space 119 permits additional flow of air from the rotation of the mirror 71 with respect to the housing 59. In the application of the rotating mirror assembly to a thermograph instrument, it is especially desirable to keep the reflective surfaces of the mirror element 61 at a low temperature since if the surfaces are permitted to get excessively warm, their temperature may be read by the infrared detector and result in a noisy visual image being produced.

As previously mentioned, the cylindrical housing portion 59 is preferably made of a ferrous material for maximum shielding of undesirable radiation from the motor therewithin. The mounting flange 57 and the cap 75 may also be of a ferrous material or may be of a non-ferromagnetic material such as aluminum. Similarly, the rotating mirror element 51 may either be a ferrous material or a non-ferromagnetic material such as aluminum. The non-ferromagnetic material is preferred for the mirror element 61 so that, as discussed hereinabove, it will not become magnetized. A nonmagnetic material for the mirror element 61 prevents a further possible source of undesirable noise in a compact precision image scanning instrument.

The material for the polygon mirror element 61 is preferably aluminum. Besides being non-ferromagnetic, the aluminum is very light and thus forms a mirror element 61 that has a low inertia. To form the highly reflective surfaces on the outside of the mirror element 61, the outside is plated with copper with nickel deposited thereover by electrolysis. The mirror surfaces are then polished to form precision optical flat surfaces.

Even when the mirror element 61 is made of aluminum, it does contribute somewhat to shielding the environment outside of the rotating mirror assembly from undesirable radiation generated by the motor within. Depending on the thickness of the main ferromagnetic housing 59, such undesirable radiation may be suppressed 40–60 db. thereby while the aluminum mirror element 61 may suppress such radiation by an additional 6–12 db. The top of the mirror element 61 includes a raised portion 119 to provide a thickness of the material at the top of the mirror element 61 for increased suppression of unwanted radiation. This is especially desirable if aluminum is used for the upper cap 75.

Another advantage of the structure of the rotating mirror assembly described with respect to the drawings is that the structure can be oriented with the axis of rotation of the shaft 89 in any desired position such as horizontal. It is not required that the axis of rotation of the shaft 89 be made vertical in order for the assembly to operate properly with all the above-mentioned advantages. The entire mirror assembly can even be inverted by rotation 180° from the orientation shown in the drawings, if desired.

Although the improved rotating mirror structure of the present invention has been described with a detailed specific example thereof, it will be understood that the invention is entitled to the protection within the full scope of the appended claims.

We claim:

1. A rotating mirror assembly, comprising
   an electric motor having a shaft rotated thereby about an axis of rotation at a constant angular velocity, said shaft extending out of at least one end of said motor,
   a stationary housing enclosing said motor in a manner to permit rotating shaft to extend therethrough at one end thereof,
   a mirror element including a plurality of planar reflective outside surfaces that are parallel to a center axis of said mirror element, said plurality of reflective outside surfaces joined together to form a regular polygon when viewed in cross-section across a plane that is perpendicular to the mirror center axis, said mirror element being closed at one end thereof across a plane perpendicular to said mirror center axis while being otherwise substantially hollow and open at its other end, and
   means for fixedly attaching said mirror element at its said closed end to the motor shaft portion extending beyond said housing in a manner that said axis of rotation and said mirror element center axis are coincident and in a manner that said plurality of reflective outside surfaces surround at least a portion of said housing.

2. A rotating mirror assembly according to claim 1 wherein said means for attaching said mirror element to said rotating shaft includes a mounting flange rigidly connected to said shaft for rotation therewith interior of said mirror element closed end and means for connecting said mirror element closed end to said flange in a manner that it may be tilted with respect thereto for adjusting the center axis of said mirror element with respect to the axis of rotation of said shaft.

3. A rotating mirror assembly according to claim 1 wherein said rotating shaft is journaled to said housing at two positions, one position being where said shaft extends through said housing and another position being on an opposite side of the motor at an opposite side of said housing.

4. A rotating mirror assembly according to claim 1 wherein the mirror element and housing are held relative to one another to form a space therebetween for air flow.

5. A rotating mirror assembly according to claim 1 wherein at least a portion of said housing is constructed of a ferromagnetic material for efficiently shielding an environment outside of said mirror assembly from said motor and said mirror element is constructed substantially entirely of non-ferromagnetic material.

6. A rotating mirror assembly, comprising
   a housing, at least a portion of which is constructed of a ferromagnetic material,
   an electric motor within said housing, and
   a mirror element constructed substantially entirely of non-ferromagnetic material and having a plurality of mirror reflective elements joined together to form a shell extending from an end piece, said mirror element being operably connected to said motor for rotation thereby and further being positioned to cover at least a portion of said housing.

7. A rotating mirror assembly according to claim 6 wherein said motor is an alternating current synchronous motor designed for operation at 60 Hz.

8. A rotating mirror assembly according to claim 6 wherein said mirror element is formed substantially of aluminum that is coated with a highly reflective material on its outside surfaces.

9. A rotating mirror assembly according to claim 6 wherein said plurality of mirror reflective surfaces on said mirror element includes exactly six planar reflective surfaces joined together at their sides thereof in a manner that a cross-sectional shape is a regular polygon.

10. In an infrared electromagnetic energy detecting thermograph contained within a single package and having a rotating polygon mirror assembly for scanning an image in a horizontal direction across a single element detector, a rocking mirror assembly for scanning said image vertically across said detector, a cathode ray tube for displaying an optical image of said object field, video processing circuits for operably connecting said detector with said cathode ray tube, and scanning circuits for synchronizing the scanning of an electron beam of said cathode ray tube with the mechanical motion of said rotating polygon and rocking vertical mirror assemblies, the improvement wherein said polygon mirror assembly comprises:

an electric motor having a shaft rotated thereby about an axis of rotation, said shaft extending out of at least one end of said motor, a housing enclosing said motor in a manner to permit said rotating shaft to extend therethrough at one end thereof, at least a portion of said housing being constructed of a ferromagnetic material, and a mirror element including a plurality of planar reflective surfaces of equal rectilinear shape joined together with equal angles therebetween in a manner to form a hollow shell, said mirror element connected to said shaft at its extension beyond said housing in a manner that said reflective surfaces remain parallel with the axis of rotation of said shaft and so that said hollow shell encloses at least a portion of said housing, said mirror element additionally being formed substantially entirely of non-ferromagnetic material.

11. An improved infrared thermograph according to claim 10 wherein said mirror element is constructed primarily of aluminum.

12. For an instrument having a scanning optical system installed in a single package along with video signal processing circuits, a rotating mirror assembly comprising:

an electric motor having a shaft rotated thereby about an axis of rotation, said shaft extending out of at least one end of said motor, a ferromagnetic housing enclosing said motor in a manner to permit said rotating shaft to extend therethrough at one end thereof, a substantially non-ferromagnetic mirror element including a plurality of planar reflective outside surfaces that are parallel to a center axis of said mirror element and joined together to form a hollow cylinder-like shell, said cylinder-like mirror element being closed at one end thereof across a plane perpendicular to said mirror center axis while being open at its other end, and means for fixedly attaching said mirror element at its said closed end to the motor shaft portion extending beyond said housing in a manner that said axis of rotation and said mirror element center axis are coincident and in a manner that said cylinder-like mirror element surrounds at least a portion of said housing adjacent said one end of the housing.

13. A rotating mirror assembly according to claim 12 wherein said mirror element attaching means comprises:

a mounting flange rigidly connected to said shaft for rotation therewith interior of said mirror element, means for fixedly attaching said flange to the mirror element closed end, and adjustable spacer means attached to the mirror element closed end for setting the angle between the closed end of the mirror element and said flange, whereby the mirror element center axis may be adjusted with respect to the motor shaft axis of rotation.

14. In an electromagnetic imaging apparatus contained within a single package that includes an optical scanning system, an electromagnetic energy detector and video processing electronic circuits, a rotating mirror assembly comprising:

a housing, at least a portion of which is constructed of a ferromagnetic material, an electric motor within said housing, and a mirror element constructed substantially entirely of non-ferromagnetic material and having a plurality of mirror reflective elements joined together to form a shell extending from an end piece, said mirror element being operably connected at its said end piece to said motor for rotation thereby and further being positioned to cover at least a portion of said housing.

* * * * *